9318X
No Printed Specification Available
C. R. BELT.
Seed-Planter.
Patented Jan. 15, 1836.
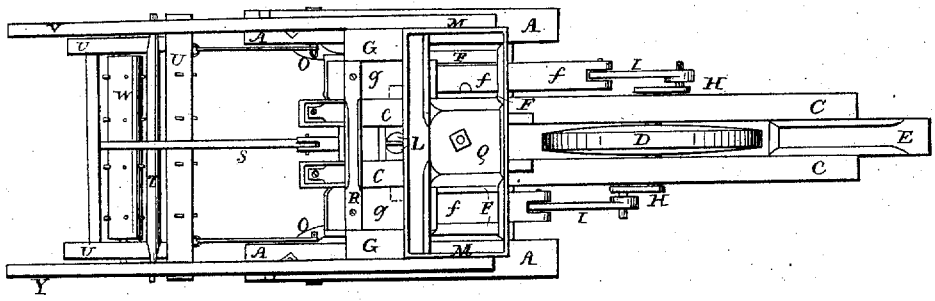
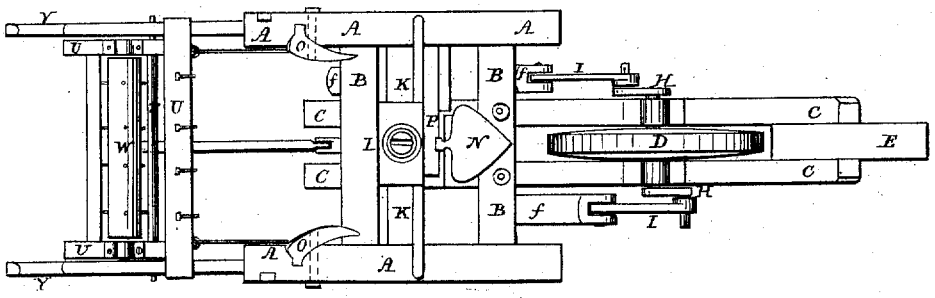
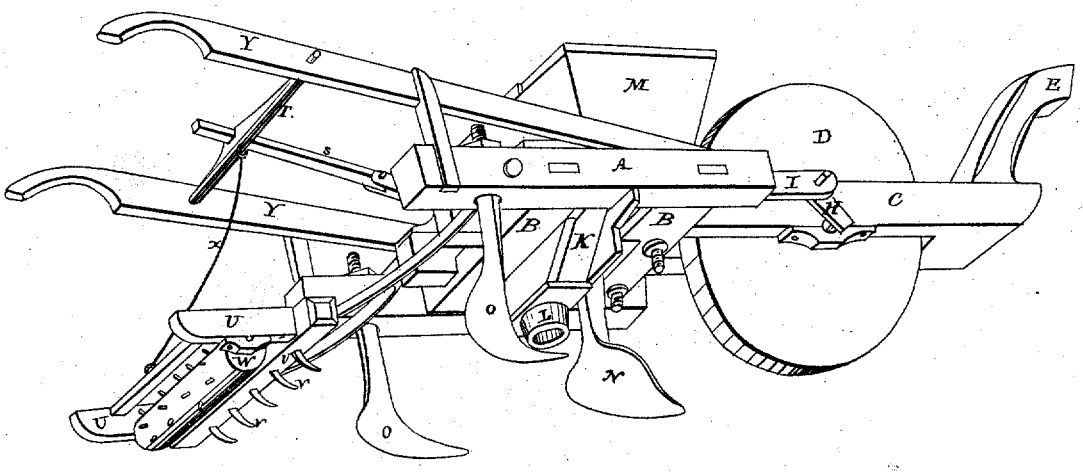
AM. PHOTO-LITHO. CO. N.Y. (OSBORNE'S PROCESS.)

Jan. 15. 1836

Charles R. Belt
Letters Patent

9318X

The Schedule referred to in these Letters Patent and making
part of the same containing a description in the words of the said
Charles R. Belt of his improvement in the machine for Plant
ing Corn — To all to whom these presents shall come —
Be it known that I Charles R. Belt residing in the vicin
ity of Washington and in the district of Columbia, and State
of Maryland have invented a new and useful improvement
in the machine used for (planting) corn and that the following
is a full and exact description of the construction and operation
of the said machine as invented or improved by me ——
A square frame is to be formed by two side pieces connected
by cross bars, the size of which will vary according to the wish
of the builder. A little on each side of the centre of these cross
bars & on the top thereof is to be placed ~~[illegible]~~ across each another
long bar running parallel with the sides and project
ing some distance in front of the cross bars. It is intended
that a wheel should play between them in front of the
frame, and beyond that is applied the point of draught
Bolts will secure the [illegible] or crossings of these pieces &
between the side & the long parallel bar, the spaces enclosed by
a broad flat groove resting at each end on the cross bar
beneath it. A similar groove lies on the other space on
the opposite side and in each of them a long sliding bar
plays which exactly fills the groove and may be some
what shorter than the side piece, but will project in front
towards the axle of the wheel having a crank on each end
to which it is united by means of connecting bar & pivot
joint so that the motion of the slides may be always horizontal
Beneath these slides and grooves is placed a long narrow hopper
shaped box for the seed to drop into. A cylinder across the frame
from from side to side in length & occupies in width nearly half the
space between the cross bars one side of the box making about a
central division between them which with its opposite side is placed
perpendicularly, having both the ends (sloping) from the side
piece of the frame to the nozzle or mouth of the box where all
four unite in a tube through which the seed drops ——

This box has a division in its centre from one side to the
other and extending nearly as low as the mouth tube the use of
which will be found very essential as it is intended to prevent
the seed from rebounding or flying out obliquely & consequently ir-
regularly in the trench. Now the manner in which I deposite
the seed regularly in this box is by the following contrivance.

Having already said that the length of its spout at its sloped
ends under the groove, form a small hole through this piece
near the back end, sufficient for the seed to pass & it will
consequently drop into the box & slides down its sloped edge
& out at the mouth of the tube again in order to bring
the seeds separately or few in number & at intervals to this
hole, I make another hole in the sliding bar (which works
in this groove) near the back end & so proportioned that the length
of the crank arm shall cause it whilst thrust backwards & for
wards to pass over on to the hole in the groove. The seed which
lies in a covered hopper & in sufficient quantity for a sowing
about and in contact with the slide, must be passed into
this hole & there remain until by the motion of the slide it
is thrust on towards the hole in the groove on arriving at
which & the opening being free it drops into the box and out at
the tube mouth into the trench, which has been previ-
ously opened by a shovel or other shaped plough connect-
ed with the frame in front of the tube mouth. The seed
is covered by hoes or other shaped coulters running behind
& on each side of the tube & secured in the hinder end of
each side of the frame. The plough shank passes ~~through~~ in through a plate fastened between the long parallel
bars underneath and in front of the hopper shaped box. it
also rises through a block placed above these bars & in the
seed hopper where at its end is a nut and screw to receive
it) Beneath the plate a shoulder is made on the
back of the shank intended not only to bear against
the plate but also to allow of the application of a wedge
in order to regulate the depth of ploughing) this being
thrust in between the shoulder and plate of course drives
out the plough blade further into the ground. The block
above also slopes to an edge at each side, opposite to
a corresponding slope attached to the ends of the box in
order to keep the seed collected as much over the sliding
bars as possible. It will be desirable at times such as
at turning &c to stop sowing for this I have the following
contrivance. On the top of each side piece of the frame
I fasten on a broad flat strip to lap a little way over the
grooved piece & thereby hold it fast the strip to be about as long
as the groove. On the inner under edge where it so laps I form
a groove and place another tongued flat strip so wide as to
fill up the space between or from this groove and the long pa-
rallel bar next to it & to lie immediately on top of the sliding
bar which has the hole in it so close as to prevent seed getting
between. These tongued pieces are connected together by a
short cross bar laid across the long parallel ones & from this
a long tongue or rod leads to the narrow connecting rod be-
tween the handles which are fastened to the sides of the
frame. Here then is placed a pin to fit two holes made in
the end of this tongue. Now the length of the tongued strips is
such as that when the short cross bar is thrust forward as far as
the side of the hopper of seed which stops it, then they will cover
the holes and prevent the escape of the seed. If at this point
a hole in the tongue is fitted to the pin to retain it there as long as desired
to

9318X to cease sowing. The tongue being raised of the pin & the cross bar
& strips removed or drawn back uncovers the holes for recommen-
cing & here another hole in the tongue fits the pin in like manner.
To prevent the short cross bar and strips from being withdrawn
too far, a stop or check is placed on the back end of each paral-
lel bar. By this arrangement the advance of the ma-
chine deposites the seed regularly and uninteruptedly in the
trench & also covers it — but in order to render the ground
as smooth and fine as desirable. I also attach a harrow to the
ends of the side pieces of the frame. so as to follow and complete
the operation. This harrow frame contains a combination
of the stationary or fixed teeth & the revolving cylinder of teeth.
the frame being furnished on the front bar with a set of teeth
curving forwards & behind these revolves a cylinder furnished
with smaller straight ones. A cord attached to the hind
bar & from thence to the connecting rod between the handles,
suspends the harrow at the time of turning or raising the hand-
les. These last are long enough to project behind the harrow so
as to allow room for the ploughman to walk and guide
the [illegible] I also apply to other seeds as peas &c. What
I claim as my invention and not previously known in the
above described machine is First The manner of producing
the motion in the sliding bar by means of the crank arm
and pivot joints but not the construction of the sliding
bar & hole. Second the method of covering the holes by
means of the tongue flat strips and groove piece & the con-
necting short cross bar by which to operate them. In tes-
timony that the above are exact description of the construc-
tion of my improvement as invented by me I have hereunto
set my hand this third day of October in the year eighteen hun-
dred and thirty five Elias R. Beck Witnesses
C. H. W. Whalen
Henry Stone

[75 Shiinbeds,]